United States Patent
Arnold et al.

(10) Patent No.: US 8,762,945 B2
(45) Date of Patent: *Jun. 24, 2014

(54) METHOD FOR MANAGING LIFECYCLES FOR VIRTUAL IMAGE ASSETS

(75) Inventors: William C. Arnold, Newburgh, NY (US); Murray J. Beaton, Ajax (CA); Daniel C. Berg, Holly Springs, NC (US); Tamar Eilam, New York, NY (US); Michael H. Kalantar, Chapel Hill, NC (US); Alexander V. Konstantinou, New York, NY (US); Gili Mendel, Cary, NC (US); Tova Roth, Woodmere, NY (US); Harm Sluiman, Toronto (CA); Edward C. Snible, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/612,274

(22) Filed: Sep. 12, 2012

(65) Prior Publication Data

US 2013/0007745 A1 Jan. 3, 2013

Related U.S. Application Data

(63) Continuation of application No. 12/895,538, filed on Sep. 30, 2010.

(51) Int. Cl.
*G06F 9/44* (2006.01)

(52) U.S. Cl.
USPC ........... 717/121; 717/100; 717/101; 717/120; 717/122; 717/123

(58) Field of Classification Search
None
See application file for complete search history.

(56) References Cited

U.S. PATENT DOCUMENTS 6,640,238 B1 10/2003 Bowman-Amuah
7,702,186 B1 4/2010 Chandra
(Continued)

OTHER PUBLICATIONS

GTSI Corp., "Technology Lifecycle Management," Model for Enabling Systematic Budgeting, Administration of Government Technology Programs, 2008.
CA Transforming IT Management, "IT Asset Management—A Cornerstone for Accelerating ITIL Success," Technology Brief; IT Asset Management and ITIL, 2007.
IBM Corporation, "IBM Smart Business—Development & Test on the IBM Cloud," V10709, 2009.

(Continued)

*Primary Examiner* — Don Wong
*Assistant Examiner* — Roberto E Luna
(74) *Attorney, Agent, or Firm* — Jose Gutman; Fleit Gibbons Gutman Bongini & Bianco PL

(57) ABSTRACT

Lifecycles of virtual image assets are managed as follows. A set of assets including a set virtual image assets and a set of software bundle assets are analyzed. At least a portion of relationship data between one or more of the virtual image assets and one or more of the software bundle assets is determined. The at least a portion of relationship data is stored in a memory. At least one of one or more virtual image assets and one or more software bundle assets are determined to be associated with a set of changes. At least one virtual image asset that is related to the one or more virtual image assets and/or one or more software bundle assets associated with the set of changes is identified. The at least one virtual image asset that has been identified is updated based on the set of changes.

6 Claims, 9 Drawing Sheets

(56) References Cited

U.S. PATENT DOCUMENTS

| | | | |
|---|---|---|---|
| 2006/0179080 A1* | 8/2006 | Meek et al. | 707/200 |
| 2007/0006122 A1* | 1/2007 | Bailey et al. | 717/101 |
| 2008/0244595 A1* | 10/2008 | Eilam et al. | 718/104 |
| 2009/0089860 A1* | 4/2009 | Forrester et al. | 718/1 |
| 2010/0017797 A1 | 1/2010 | Hwang | |
| 2010/0030607 A1 | 2/2010 | Holcombe et al. | |
| 2010/0054527 A1 | 3/2010 | Kirmse et al. | |

OTHER PUBLICATIONS

IBM Corporation, "IBM Smart Business—Development & Test on the IBM Cloud (V1.3 Pilot)," V1.3 (pilot), 2009.

Boaz Allen Hamilton, "Governance Considerations for the Cloud—Cloud Computing and SCAP," Oct. 2009.

Final Office Action dated Oct. 10, 2013, for U.S. Appl. No. 12/895,538.

* cited by examiner

| COMPONENTS 202 | TYPE 204 | RELATIONSHIP TO IMAGE ASSET 206 | RELATIONSHIP TO BUNDLE ASSET 208 | COMPATIBILITY 210 | ASSOCIATED USERS 212 | ⋮ |
|---|---|---|---|---|---|---|
| A | BUNDLE ASSET | 216 | | FAILED ON B SATISFIED BY D VERIFIED ON D | USER_1 USER_N 228 | ⋮ |
| B | IMAGE ASSET | EXTENDED BY C 218 | 222 | 226 | USER_6 | ⋮ |
| C | IMAGE ASSET | EXTENDS B EXTENDED BY D | USES E USES F | FAILED ON C | USER_5 | ⋮ |
| D | IMAGE ASSET | EXTENDS C | USES G | | USER_3 USER_4 USER_Z | ⋮ |
| E | BUNDLE ASSET | USED BY C 220 | REQUIRES F CONFIGURED BY F | 224 | USER_2 USER_Y | ⋮ |
| F | BUNDLE ASSET | USED BY C | USED BY C | | USER_5 | ⋮ |
| G | BUNDLE ASSET | USED BY D | USED BY D | | USER_5 | ⋮ |

| COMPONENTS 202 | TYPE 204 | RELATIONSHIP TO IMAGE ASSET 206 | RELATIONSHIP TO BUNDLE ASSET 208 | COMPATIBILITY 210 | ASSOCIATED USERS 212 | VERSION 402 | VERSION RELATIONSHIP 404 |
|---|---|---|---|---|---|---|---|
| A | BUNDLE ASSET | | | FAILED ON B V1.0 SATISFIED BY D V1.0 VERIFIED ON D V1.0 | USER_1 USER_N | 1.0 *406* | *410* |
| B | IMAGE ASSET | EXTENDED BY C V1.0 | USES E V1.0 USES F V1.0 | | USER_6 | 1.0, 2.0 *408* | VERSION 2.0 SUPERSEDES VERSION 1.0 |
| C | IMAGE ASSET | EXTENDS B V1.0 AND V2.0 EXTENDED BY D V1.0 | USES G V1.0 | FAILED ON C V1.0 | USER_5 | 1.0 | |
| D | IMAGE ASSET | EXTENDS C V1.0 | REQUIRES F V1.0 CONFIGURED BY F V1.0 | | USER_3 USER_4 USER_Z | 1.0 | |
| E | BUNDLE ASSET | USED BY C V1.0 | USED BY C V1.0 | | USER_2 USER_Y | 1.0 | |
| F | BUNDLE ASSET | USED BY C V1.0 | USED BY D V1.0 | | USER_5 | 1.0 | |
| G | BUNDLE ASSET | USED BY D V1.0 | | | USER_5 | 1.0 | |
| ⋮ | ⋮ | ⋮ | ⋮ | ⋮ | ⋮ | ⋮ | ⋮ |

METHOD FOR MANAGING LIFECYCLES FOR VIRTUAL IMAGE ASSETS

CROSS-REFERENCE TO RELATED APPLICATIONS

This application is continuation of and claims priority from U.S. patent application Ser. No. 12/895,538 filed on Sep. 30, 2010, the disclosure of which is hereby incorporated by reference in its entirety.

BACKGROUND

The present invention generally relates to computing system virtualization technologies, and more particularly relates to managing the lifecycle of virtual image assets.

Virtualization technologies, such as, for example, VMware (available from VMware, Inc. Palo Alto, Calif.), and XEN (open source virtualization software) are becoming increasingly popular. Such virtualization technologies enable a user to seamlessly partition resources of a single physical machine into multiple virtual machines (VMs). Each virtual machine runs its own operating system (OS) and software stack. Virtual image assets and software bundle assets can be changed or updated over time. Many current systems for managing these lifecycle changes of image and software bundle assets generally require an administrator to manually manage these updates. Software bundle authors and virtual machine authors manually keep track of and notify users who are using the items together, along with ad-hoc information about bundle and VM image asset compatibility. This manual tracking of updates is very cumbersome and inefficient, and sometimes even inaccurate. Also, administrators and image/software bundle authors may not know that updates have occurred to components that they used to build their images or bundles assets.

BRIEF SUMMARY

In one embodiment, a method for managing lifecycles of virtual image assets is disclosed. The method comprises analyzing a set of assets including a set virtual image assets and a set of software bundle assets. At least a portion of relationship data between one or more of the virtual image assets and one or more of the software bundle assets is determined. Basic and derived relationship data is stored in a memory. At least one of one or more virtual image assets in the set of virtual image assets and one or more software bundle assets in the set of software bundle assets are determined to be associated with a set of changes. At least one virtual image asset in the set of virtual image assets that is related to the one or more virtual image assets and/or the one or more software bundle assets associated with the set of changes is identified. The at least one virtual image asset that has been identified is updated based on the set of changes.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 2 is a table showing relationship information between virtual image assets according to one embodiment of the present invention;

FIG. 4 is a table showing relationship information between virtual image assets and version information of the assets according to one embodiment of the present invention;

DETAILED DESCRIPTION

Operating Environment

Figure 1:
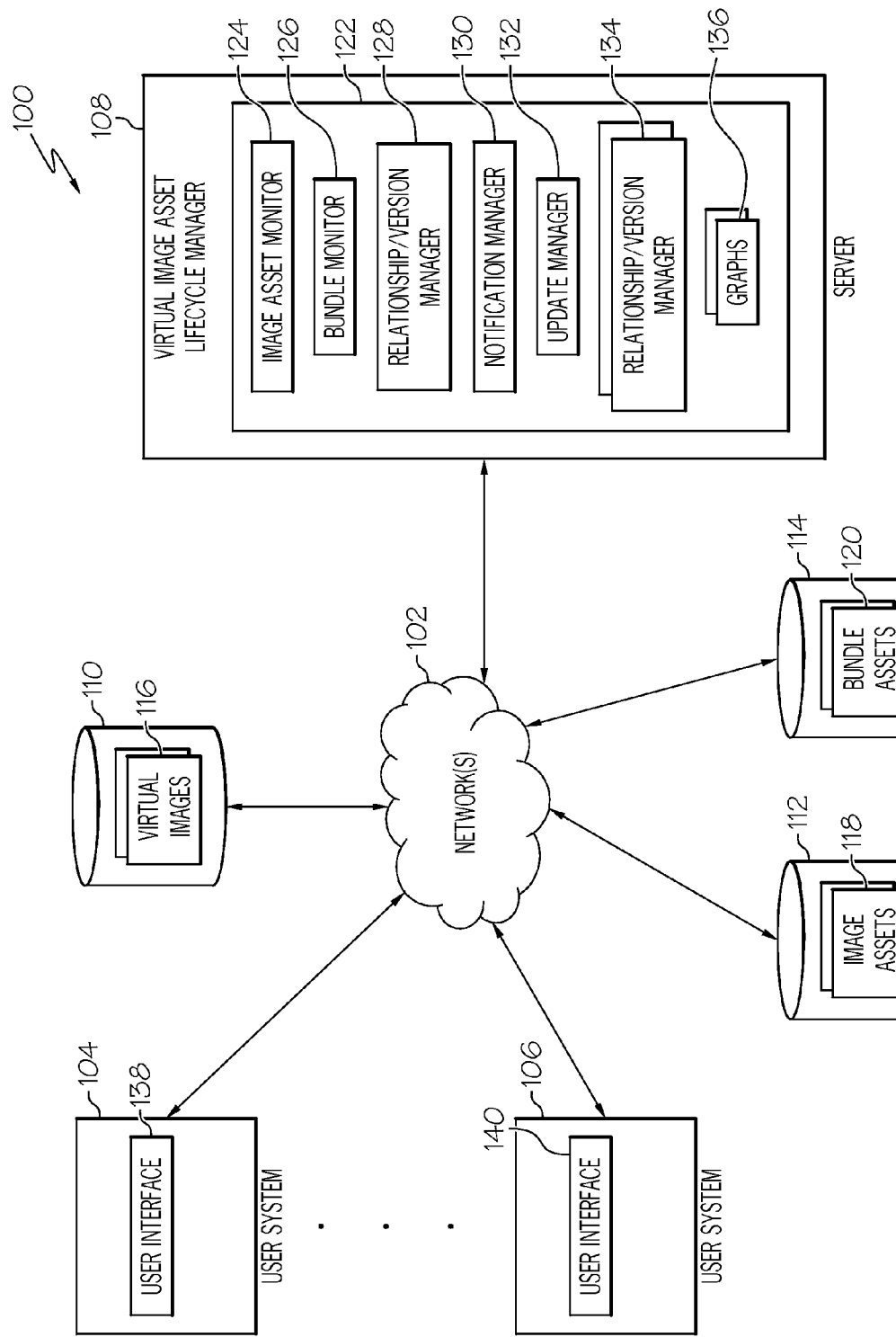
FIG. 1 is a block diagram illustrating one example of an operating environment comprising according to one embodiment of the present invention.

FIG. 1 shows one example of an operating environment 100 applicable to various embodiments of the present invention. It should be noted that the operating environment 100 can be a cloud computing environment or a non-cloud computing environment. Various embodiments of the present invention are capable of being implemented in conjunction with any other type of computing environment now known or later developed. For example, various embodiments of the present invention are applicable to any computing environment with a virtualized infrastructure or any other type of computing environment.

In particular, FIG. 1 shows one or more networks 102 that, in one embodiment, can include wide area networks, local area networks, wireless networks, and/or the like. In one embodiment, the environment 100 includes a plurality of information processing systems 104, 106, 108 that are communicatively coupled to the network(s) 102. The information processing systems 104, 106, 108 include one or more user systems 104, 106 and one or more servers 108. The user systems 104, 106 can include, for example, information processing systems such as desktop computers, laptop computers, wireless devices such as mobile phones, personal digital assistants, and the like. The user systems 104, 106 can be associated with users such as administrators of the server 108, image asset authors, bundle asset authors, or the like.

The operating environment 100 also comprises one or more storage devices 110, 112, 114 that are communicatively coupled to the network(s) 102. It should be noted that one or more of the server 108 and storage devices 110, 112, 114 can be located within a cloud computing environment or within a local computing environment. A set of storage devices 110 comprises a set of virtual images 116. Another set of storage devices 112 comprises a set of virtual image assets 118 also referred to herein as an "image asset", or other similar variations, which are used interchangeably. A set of composable software bundle assets 120 reside within yet another set of storage device 114. A composable software bundle is herein referred to as a "bundle", software bundle", "software bundle asset", "bundle asset", or other similar variations, which are used interchangeably. Virtual image assets 118, in one embodiment, comprise metadata and artifacts for creating and managing at least virtual image 116. An image asset 118 comprises the an image description and any required disk images, scripts, binaries, etc., either directly or by reference, needed to deploy the image asset. A bundle asset 120 is a cloud independent description of software that captures the aspects needed to install and configure its associated software in a virtual machine. This description allows the bundle to be used to support image construction for multiple target cloud platforms.

The commonly owned and co-pending U.S. patent application Ser. No. 12/895,461 entitled "SEMANTICALLY RICH COMPOSABLE SOFTWARE IMAGE BUNDLES", which is hereby incorporated by reference in its entirety, discusses composable software bundle assets and virtual image assets based thereon in greater detail.

These image assets 118 and bundle assets 120 can be changed/updated over time. For example, an image author can add or delete a software bundle from an image. The software within a software bundle can be updated from an old version to a new version. Therefore, the server 108, in one embodiment, comprises a virtual image asset lifecycle manager (VIALM) 122. The VIALM 122 manages updates to image assets 118 and the software bundle assets 120.

As will be discussed in greater detail below, the VIALM 122 maintains a directed graph of relationships whose nodes are image and software bundle assets. An augmented tree-like structure stores parent/child relationships (for example, "extended by"/"extends") between source image assets and their derived image assets. Each derived image asset has a parent image asset, and a parent image asset can have any number of derived image assets. A derived image asset can itself be a parent to any number of derived image assets. Similarly, relationships indicate if a software bundle assets extends other software bundle assets. A software bundle can also require another software bundle ("requires"/"required by"), for example, a software bundle that installs software may require a software bundle that configures the software, or a software bundle that installs a security fixpack. In addition, relationships are maintained between image assets (source or derived) and the software bundle assets. Therefore, if an image asset along a tree is updated, all derived image assets are identified and appropriate action is taken. If a software bundle asset is updated, all images that use either the bundle or an extension of the bundle are identified, and in turn, all image assets derived from the affected image assets are identified, and appropriate action is taken. Relationships are also maintained between asset versions.

The VIALM 122 comprises an image asset monitor 124, a bundle asset monitor 126, a relationship/version manager 128, a notification manager 130, an update manager 132, relationship/version information 134, and graphs 136. The image asset manager 124 monitors changes/updates to the image assets 118. The bundle asset manager 126 monitors changes/updates to the bundle assets 120. The relationship/version manager 128 stores and manages the change/update information received from the asset managers 124, 126. The relationship/version manager 128 maintains relationship/version information 134 that tracks image assets, software bundle assets, extensions to those assets, and images that have been composed of those assets. The relationship/version manager 128 also tracks file content and relationship changes between assets. The relationship/version manager 128 further tracks the set of users who require notification when an asset is updated. The notification manager 130 notifies the set of users identified by the relationship/version manager 128 when an asset is updated. The users received these notifications via a user interface 138, 140 at each of the user systems 104, 106. This user interface 138, 140 also allows the users to interact with the VIALM 122. The VIALM 122 and its components are discussed in greater detail below.

Managing Lifecycle of Virtual Image Assets

As discussed above, the VIALM 122 manages updates to image assets 118 and software bundle assets 120. The VIALM 122 automatically, without user intervention, maintains relationships between image assets and bundle assets for any point in the version or update history of the assets. The relationship information, in one embodiment, is entered by a user. The VIALM 122 utilizes this relationship information to automatically notify users affected by these changes. For example, the VIALM 122 automatically notifies an author of an image when a bundle used to create the image has been updated. The VIALM 122 also utilizes the relationship information to automatically re-derive an image asset when a bundle asset in the image asset hierarchy as been updated.

The image asset monitor 124 and the bundle asset monitor 126 analyze the image assets 118 and bundle assets 120, respectively, to gather information associated therewith. This information is then stored within the relationship/version information 134. The relationship/version manager 128 utilizes this information to generate and/or display the graphs 136 that comprises relationship information between virtual image assets 118 and/or software bundle assets 118, 120 and also any versioning information associated with the assets 118, 120.

FIG. 2 shows one example of relationship/version information 134 maintained by the VIALM 122. As discussed above, this relationship/version information 134 can be entered by a user. In particular, FIG. 2 shows a table 200 comprising a first column 202 labeled "Components", a second column 204 labeled "Type", a third column 206 labeled "Relationship To Image Asset", a fourth column 208 labeled "Relationship To Bundle Asset"; a fifth column 210 labeled "Compatibility", and a sixth column 212 labeled "Associated Users". The "Component" column 202 comprises entries that identify components of a virtual image. For example, a first entry 214 identifies "Component_A". The components can either be an image asset 118 or a bundle asset 120. The "Type" column 204 comprises a plurality of entries that identifies the type of the component identified in the first column 202. For example, a first entry 216 under the "Type" column 204 indicates that Component_A is a bundle asset.

The "Relationship To Image Asset" column 206 comprises a plurality of entries that identify the various relationships image assets have with other image assets and with bundle assets. For example, a first image asset may have been used as a base image to create a second image asset. This type of relationship is referred to as an "extended" relationship since the second image asset extends the first image asset. As an example, a first entry 218 under this column shows that Image_Asset_B (Component B under the "Component" column 202) is extended by Image_Asset_C (Component C under the "Component" column 202). In other words, Image_Asset_B was used to crate Image_Asset_C.

In one embodiment, an "extended" relationship can either by an "extend by reference" or an "extend by copy" relationship. In an "extend by copy" relationship the content of the source of the relationship, either the image asset or the bundle asset, is copied to its extension. An update to the source asset is not automatically absorbed by the extended asset. In an "extend by reference" relationship, the content of the source asset is not copied, but is referenced by the extended asset. In this type of relationship an update to the source asset is automatically absorbed by the extended asset. As will be discussed in greater detail below, the VIALM 122 identifies these types of "extended" relationships for managing updates to the source of an extension.

Another type of relationship under the "Relationship To Image Asset" column 206 is a "use" relationship. This type of relationship identifies a bundle asset used by an image asset. For example, a second entry 220 under this column shows that Bundle_Asset_E (Component E under the "Component" column 202) is used by Image_Asset_C. The "Relationship To Bundle Asset" comprises a plurality of entries that identify the relationships of an image asset to a bundle asset and a bundle asset to another bundle asset. For example, a first entry 222 under this column 208 indicates that Image_Asset_C uses Bundle_Asset_E and Bundle_Asset_F. In addition, to the "use" relationship, this column also identifies "requires" and "configured by" relationships. The "requires" relationship indicates that a given bundle asset requires another bundle asset. For example, if a bundle asset comprises the DB2v9 software for a Linux operating system, this bundle can require another bundle that configures the DB2. Therefore, this "requires" relationship is captured in the relationship/version information 134. The fact that the other bundle configures the DB2v9 bundle is also captured. For example, a second entry 224 under this column 208 shows that Bundle_Asset_E requires Bundle_Asset_F and is configured by Bundle_Asset_F.

The "Compatibility" column 210 comprises a plurality of entries that identifies the compatibility for a given bundle asset with respect to a given image asset. For example, a "satisfies" flag indicates that an image asset satisfies the requirements of a bundle asset. A "failed on" flag indicates that a bundle asset has failed to work on an image asset. A "verified on" flag indicates that a bundle asset has been verified to work on an image asset. For example, FIG. 2 shows that a first entry 226 under the "Compatibility" column 210 indicates that Bundle_Asset_A failed on Image_Asset_B; was satisfied by Image_Asset_D; and was verified on Image_Asset_D.

The "Associated Users" column comprises entries that indicate which users are to be notified when a change/update to a given image or bundle asset occurs. For example, a first entry 228 under this column 212 indicates that User_1 and User_N are to be notified when a change/update occurs with respect to Bundle_Asset_A. User that are notified by the VIALM 122 can be administrators of a computing environment where virtual images are deployed, asset authors, or the like. Asset authors can include image asset authors and owners, software bundle asset authors and owners, derived image asset authors and owners, owners of deployed image instances, and computing environment and group administrators. In addition, other interested parties, with verified credentials, can subscribe to the VIALM 122 for receiving update notification of particular assets (image or software bundles) or groups of assets.

Figure 3:
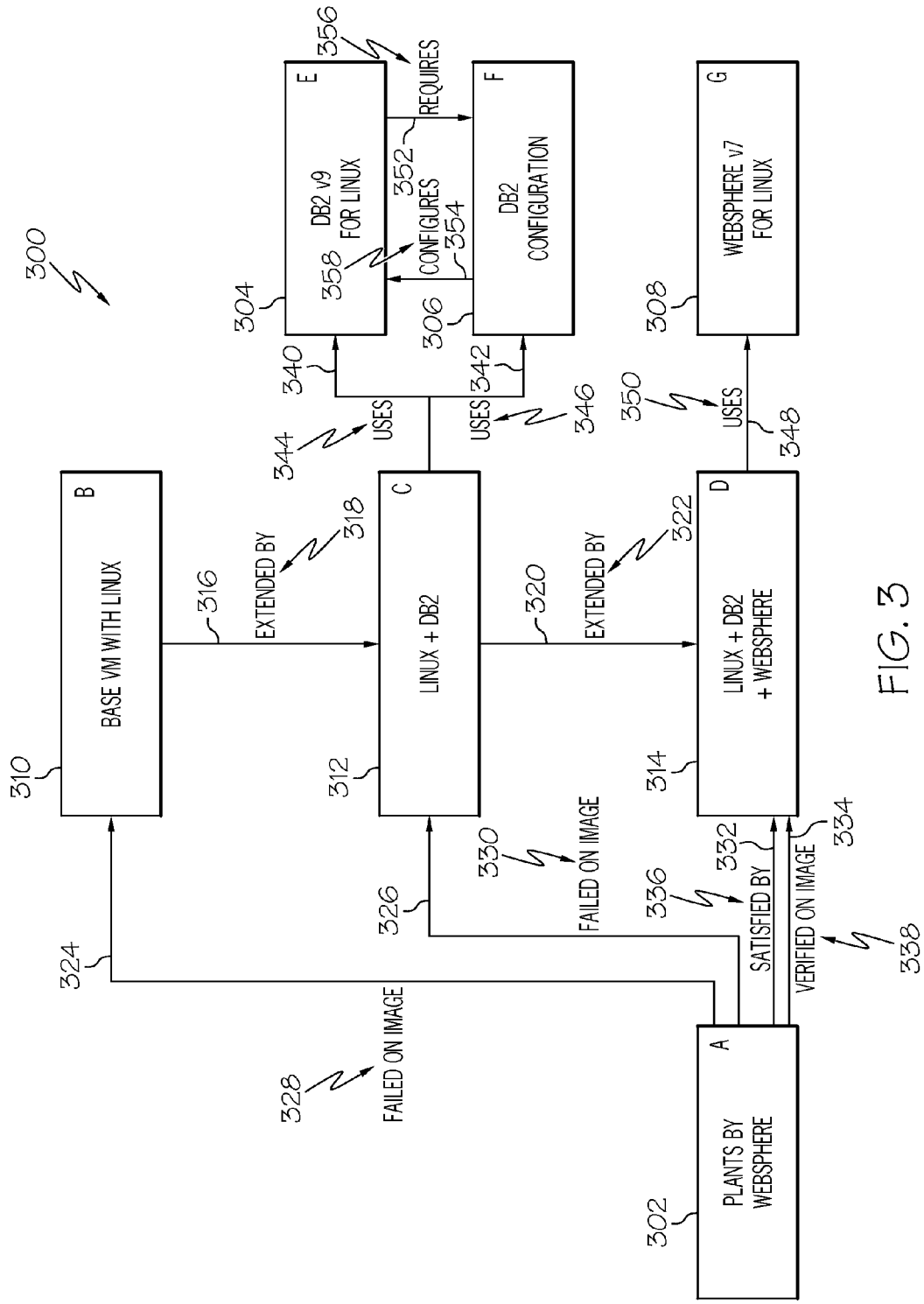
FIG. 3 is a graph illustrating virtual image asset relationships according to one embodiment of the present invention.

The relationship/version manager 128 utilizes the relationship/version information 134 to generate and/or display one or more graphs that track the image assets, software bundle assets, extensions to those assets, and images that have been composed of those assets. These graphs also track file content and relationship changes between assets. For example, FIG. 3 shows one example of a graph based on the relationship/version information 134 that illustrates the assets of a virtual image and the relationships between the assets. For example, the graph 300 in FIG. 3 comprises a plurality of bundle assets 302, 304, 306, 308 and a plurality of image assets 310, 312, 314. In other words, the graph 300 shows a composition hierarchy of image assets and bundle assets. The first image asset 310 is a base image for a Linux operating system. The graph 300 shows that this first image asset 310 is extended by a second image asset 312 that comprises Linux and DB2. In other words, the first image asset 310 was used to create the second image asset 312. This "extended by" relationship is indicated by an arrow 316 with an "extended by" annotation 318 going from the first image asset 310 to the second image asset 314. The second image asset 312 is extended by a third image asset 314 that comprises Linux, DB2, and WebSphere. In other words, the second image asset 312 was used to create the third image asset 314. This "extended by" relationship is indicated by an arrow 320 with an "extended by" annotation 322 going from the first image asset 310 to the second image asset 314.

The graph 300 also shows that a first bundle asset 302 (comprising Plants by WebSphere software, in this example) has a compatibility relationship with each of the three image assets 310, 312, 314. For example, the graph 300 shows that the first bundle asset 302 failed on the first image asset 310 and the second image asset 312. This "failed on" relationship is indicated by the arrows 324, 326 and "failed on" annotations 328, 330. However, the first bundle asset 302 was satisfied by the third image asset 314 and was also verified on the third image asset 314 as well, as shown by the arrows 332, 334 and the "satisfied" and "verified on" annotations 336, 338. The graph 300 also shows that the second image asset 312 has a "use" relationship with the second and third bundle assets 304, 306. For example, the second image asset 312 uses the second bundle asset 304 (which comprises DB2v9 for Linux) and also uses the third bundle asset 306 (which comprises software for configuring DB2), as shown by the arrows 340, 342 and the "uses" annotations 344, 346.

The graph 300 further shows that the third image asset 314 comprises/has a "use" relationship with the fourth bundle asset 308, as shown by the arrow 348 and the "uses" annotation 350. For example, the third image asset 314 uses the fourth bundle asset 308 (which comprises WebSphere v7 for Linux). The relationships between bundle assets are also shown in the graph 300. For example, the graph 300 shows the second and third bundle assets 304, 306 have a "requires" and "configures" relationship, respectively, between each other, as shown by the arrows 352, 354 and the "requires" and "configures" annotations 356, 358.

As discussed above, the image assets and/or bundle assets can be changed and/or updated. For example, an image asset can be changed to remove a previous bundle asset and add a new asset bundle. Also, a bundle asset can be updated to a newer version that provides new functionality, fixes bugs, adds greater security, and the like. Other examples of updates to images and software bundle assets can include: an update to the image file on a disk (this is external to the asset); an update to the contents of an asset; an update to asset metadata, such as ownership, group membership, categorization, name or description; an update to the set of software bundles that a software bundle requires (the asset's "requires" relationship); and an update to the state of an asset. It should be noted that these are only a few examples of how image and bundle assets can be changed/updated.

Examples of changeable states of assets include: various levels of approval for legality, security, and quality assurance; states based on asset usage (for example, active or retired); and states based on maintenance levels (for example maintained, as is). It should be noted that these are only a few examples of changeable states that are applicable to various embodiments of the present invention. The state of an asset can be automatically updated following a content or other update. For example, a formerly approved asset may need to be re-approved following a content update. In response to a state update, the VIALM 122 can automatically alter the states of derived assets. For example, if an asset's state is updated to unapproved, the VIALM 122 can set the state of all derived assets to unapproved. A state can be altered based on a usage pattern, for example, a software bundle that is not used by an image can be retired. If the state of an image or software bundle is updated, automatic notifications are propagated through the notification system to all subscribers. For example, a derived image author can be notified that an image he authored is no longer approved.

In some cases, updates occur within an asset. Also, either by user choice or by an enforced cloud policy, an update can result in the creation of a new version of the asset, while keeping the former version and its relationships. The new version is related to the former version with a supersedes relationship. Since an asset can have dependencies, such as a software bundle asset that is used by an image asset, the VIALM 122 defines policies regarding versions to support the dependent assets. If an asset is depended upon, the VIALM 122 versioning policy can enforce restrictions, such as a restriction on deleting the asset that is depended upon, or modifying the asset.

The image asset and bundle asset monitors 124, 126 of the VIALM 122 monitor the changes/updates to the assets and store this change/update data within the relationship/version information 134. For example, FIG. 4 shows another example of relationship/version information 134 maintained by the VIALM 122 comprising version and related information. The table 400 of FIG. 4 is similar to the table 200 of FIG. 2 with the exception of two new columns, a "Version" column 402 and a "Version Relationship" column 404. The "Version" column 402 comprises a plurality of entries that indicate the various versions of an asset 118, 120. For example, a first entry 406 under this column 402 indicates that Bundle_Asset_A is at Version 1.0. However, a second entry 408 indicates that Image_Asset_B is associated with two versions, Version 1.0 and Version 2.0. This indicates that Image_Asset_B has been updated from Version 1.0 to Version 2.0. The "Version Relationship" column 404 comprises entries that indicate which version of an asset is to be used. For example, a first entry 410 under this column 404 that is associated with Image_Asset_B states that "Version 2.0 supersedes Version 1.0". In other words, with respect to Image_Asset_B, Version 2.0 of Image_Asset_B is to be used.

Figure 5:
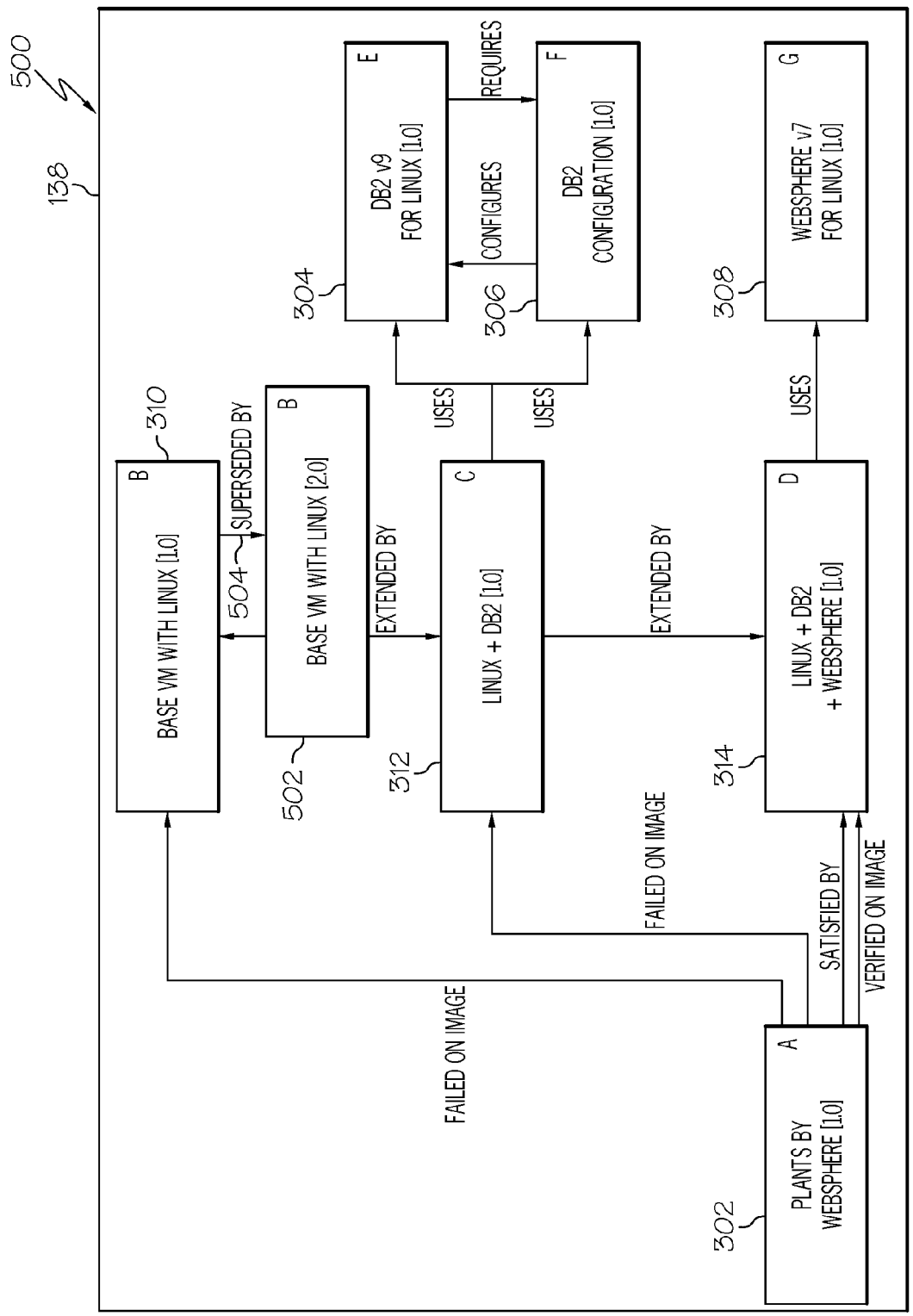
FIG. 5 is a graph illustrating virtual image asset relationships and version information according to one embodiment of the present invention.

The relationship/version manager can then add this versioning information to the graph discussed above. For example, FIG. 5 shows a graph that is similar to the graph 300 of FIG. 3 with the addition of including versioning information. For example, the graph 500 of FIG. 5 comprises the same assets 302, 304, 306, 308, 310, 312, 314 as the graph 300 of FIG. 3 with the exception of a new image asset node 502 and relationship information. As can be seen in FIG. 5, the first image asset 310 has been updated from Version 1.0 to Version 2.0 as indicated by the new image asset node 502. In addition, a new relationship 504 has been added between the first image asset node 310 and the new image asset node 502, as indicated by the arrow 504. This relationship is a "Superseded by" relationship, which indicates that Version 2.0 is to be used instead of Version 1.0. When a user such as an administrator or owner of the image 312 accepts the new version of image 502 a new image (not shown) is created in the graph. This new image would comprise a "uses" relationship with respect to software bundles 304, 306 and a "failed" relationship with respect to software bundle 302. Also, an author can supersede an image by creating a new "use" relationship that comprises a software patch to, for example, fix a bug.

It should be noted that the relationship/version information 134 and the graphs 300, 500 can be displayed to a user via the user interfaces 138, 140. This allows a user to identify the relationships of the assets 118, 120. For example, FIG. 5 shows that the graph 500 is being displayed on the user interface 138. In one embodiment, the information displayed on the user interface 138 is governed by access permissions associated with the user. For example, a bundle author may only have access to his/her bundle and the image assets that other users have used his/her bundle with. In addition, this bundle author can be shown the users who own the image assets that use his/her bundle. Other types of information that can be displayed include popular image and bundle asset combinations. This VIALM 122 can easily show this information since associated user information is maintained in the relationship/version information 134, as discussed above.

When the VIALM 122 detects an update to an image asset, the VIALM 122 uses the relationship/version information 134 and the graphs 300, 500 to identify the appropriate parties of the changes/updates and to perform automatic functions with respect to image assets 118 and bundle assets 120. As discussed above, the VIALM 122 automatically maintains notification subscriptions for computing environment administrators and asset authors and users. Therefore, the VIALM 122 can easily determine which users are to be notified. For example, when an update occurs to any asset within the composition hierarchy of a composed image the VIALM 122 traverses the hierarchical graph and identifies affected image assets and software bundle assets. The VIALM 122, via the notification manager 130, then automatically notifies the users/subscribers associated with the updated asset(s) and assets affected by the update.

Figure 6:
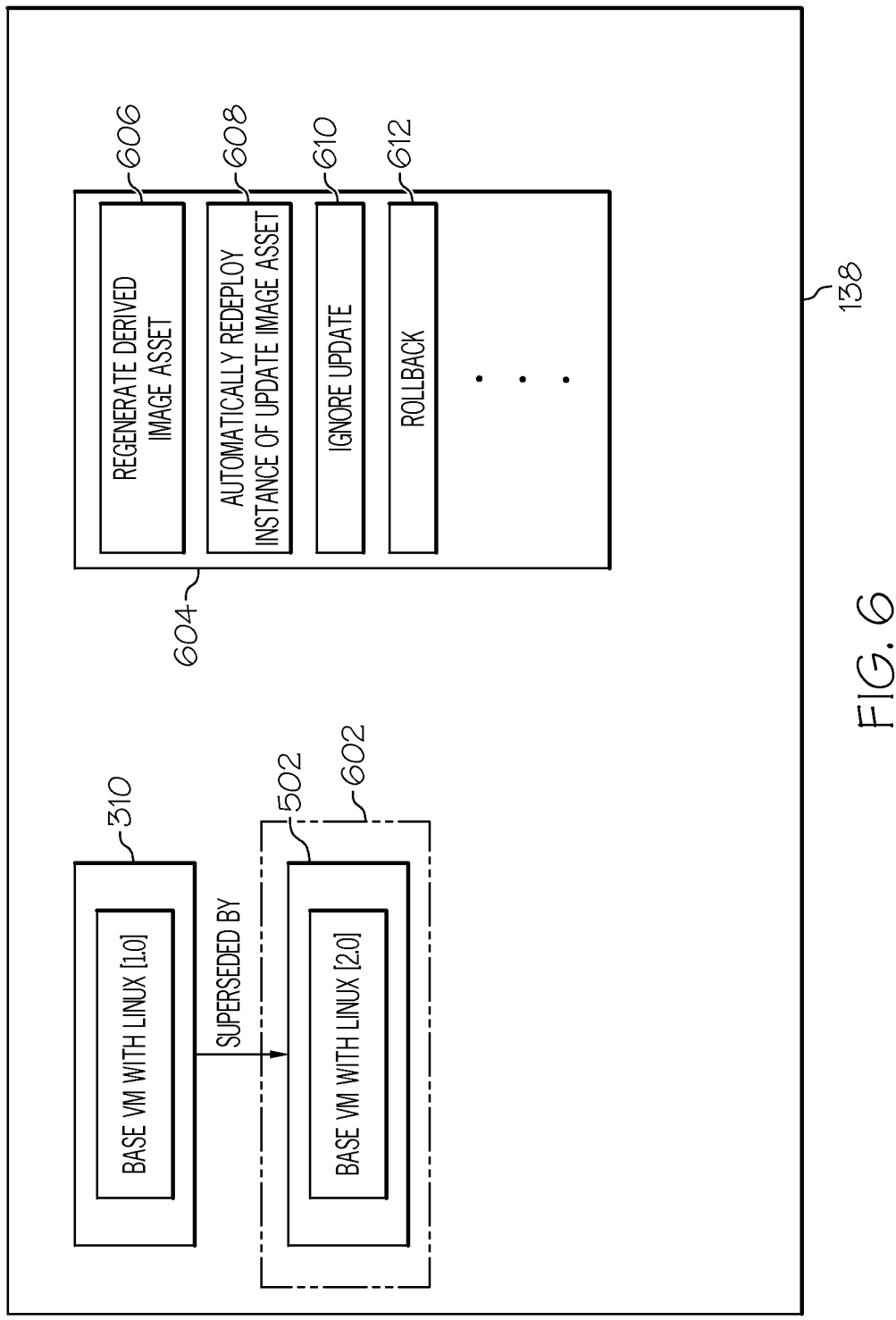
FIG. 6 is a block diagram illustrating one example of a user interface according to one embodiment of the present invention.

The notification manager 130 sends a notification to the user through the user interface 138, 140. The user is then able to update his/her virtual image asset 118 that comprises the updated asset. In one embodiment, the VIALM 122 presents various options to the user via the user interface 138, 140 with respect to a detected update. For example, FIG. 6 shows one example of a user interface 138 that is displaying an image asset 310 and its update 502. The update 502 can be visually altered, as shown by the dashed box 602, to identify the update to the user. The interface 138 also displays a set of options 604 presented by the VIALM 122 that the user can perform with respect to the update. For example, FIG. 6 shows that the user is presented with a first option 606 that allows the user to regenerate a derived image asset based on the update. A second option 608 allows the user to automatically redeploy an instance of the updated image asset. A third option 610 allows the user to ignore the update, which results in the virtual image asset 118 comprising this updated asset to not be updated. It should be noted that these are only a few examples of options that can be presented to a user with respect to a change/update occurring at an image asset. Once an update has occurred and a new derived image generated the VIALM 122 can then provide the option 612 of rolling back to a former version of an image asset. In this embodiment, the VIALM 122 uses the graph 300, 500 to regenerate the former version of the image.

Alternatively, the VIALM 122 can automatically perform various operations in response to detecting a change/update to an image asset, as compared to prompting a user. For example, the VIALM 122, via the update manager 132, can automatically regenerate a derived image asset based on the update, automatically redeploy an instance of the updated image asset, and/or ignore the update. It should be noted that these are only a few examples of options that can be automatically performed by the VIALM 122.

Operational Flow Diagrams

Figure 7:
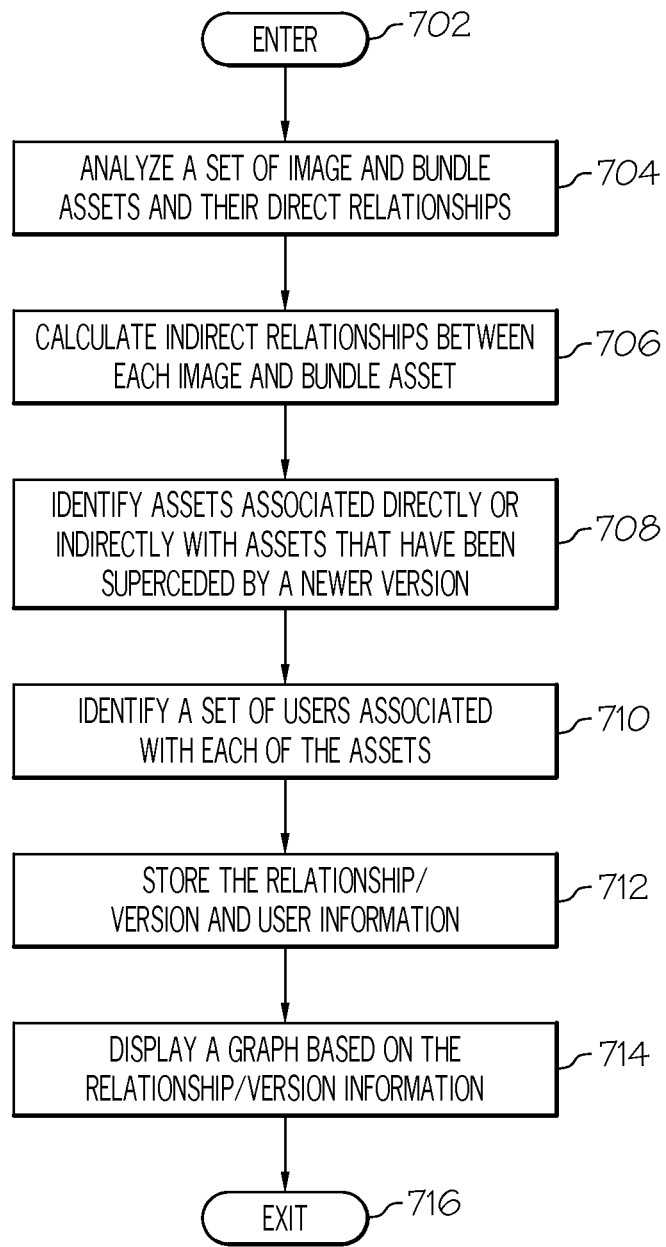
FIG. 7 is an operational flow diagram illustrating one example of managing lifecycles of virtual image assets according to one embodiment of the present invention.

FIG. 7 is an operational flow diagram illustrating one example of managing the lifecycle of virtual image assets. The operational flow of FIG. 7 begins at step 702 and flows directly into step 704. The VIALM 122, at step 704, analyzes a set of image and bundle assets 118, 120 and their direct relationships. The VIALM 122, at step 706, calculates indirect relationships between each of the assets 118, 120, as discussed above with respect to FIGS. 2-5. The VIALM 122, at step 708, identifies assets associated directly or indirectly with assets that have been superceded by a newer version, as discussed above. The VIALM 122, at step 710, identifies a set of users that are associated with each of the assets 118, 120. As discussed above, these users can be computing environment administrators, asset authors, or the like. The VIALM 122, at step 712, stores the relationship/version information 134. The VIALM 122, at step 714, then displays this relationship/version information 134 to a user via the user interface 138, as discussed above with respect to FIGS. 3 and 5. The control flow then exits at step 716.

Figure 8:
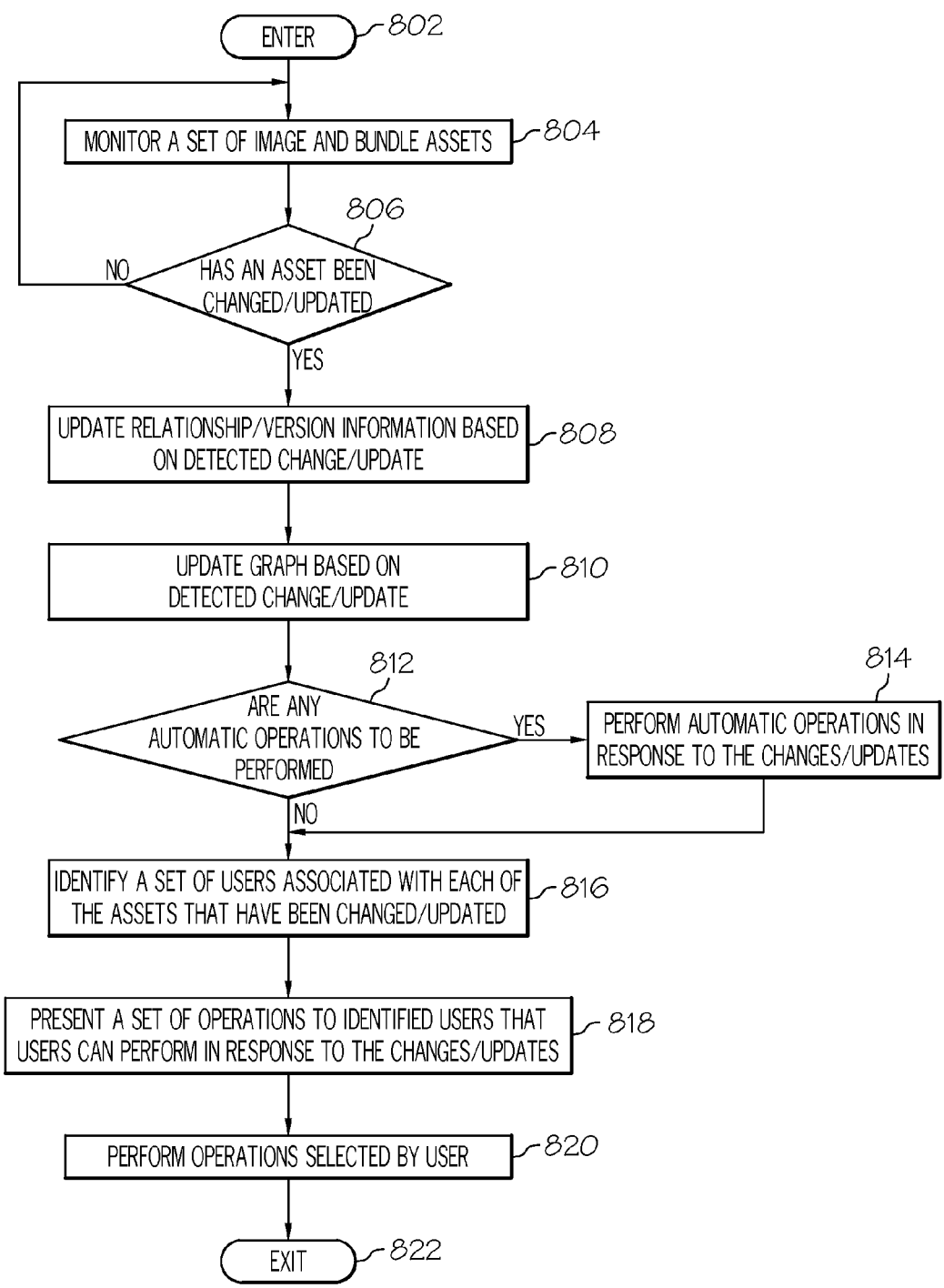
FIG. 8 is an operational flow diagram illustrating another example of managing lifecycles of virtual image assets according to one embodiment of the present invention.

FIG. 8 is another operational flow diagram illustrating another example of managing the lifecycle of virtual image assets. The operational flow of FIG. 8 begins at step 802 and flows directly into step 804. The VIALM 122, at step 804, monitors a set of image and bundle assets 118, 120. The VIALM 122, at step 806, determines if an asset 118, 120 has been changed/updated. If the result of this determination is negative, the VIALM 122 continues to monitor the assets 118, 120. If the result of this determination is positive, the VIALM 122, at step 808, updates the relationship/version information 134 based on the detected change/update. The VIALM 122, at step 810, updates the graph(s) 300, 500 based on the detected change/update.

The VIALM 122, at step 812, determines if any automatic operations are to be performed on the assets 118, 120 in response to the change/update. If the result of this determination is positive, the VIALM 122, at step 814, performs one or more automatic operations in response to the change/update, as discussed above. The control then flows to step 816. If the result of this determination is negative, the control flows to step 816. The VIALM 122, at step 816, identifies a set of users that are associated with each of the assets that have been changed/updated. The VIALM 122, at step 818, presents, via a user interface, a set of operations to the users that can be performed on the assets in response to the changes/updates. The VIALM 122, at step 820, performs the operations selected by the users, as discussed above. The control flow then exits at step 822.

Information Processing System

Figure 9:
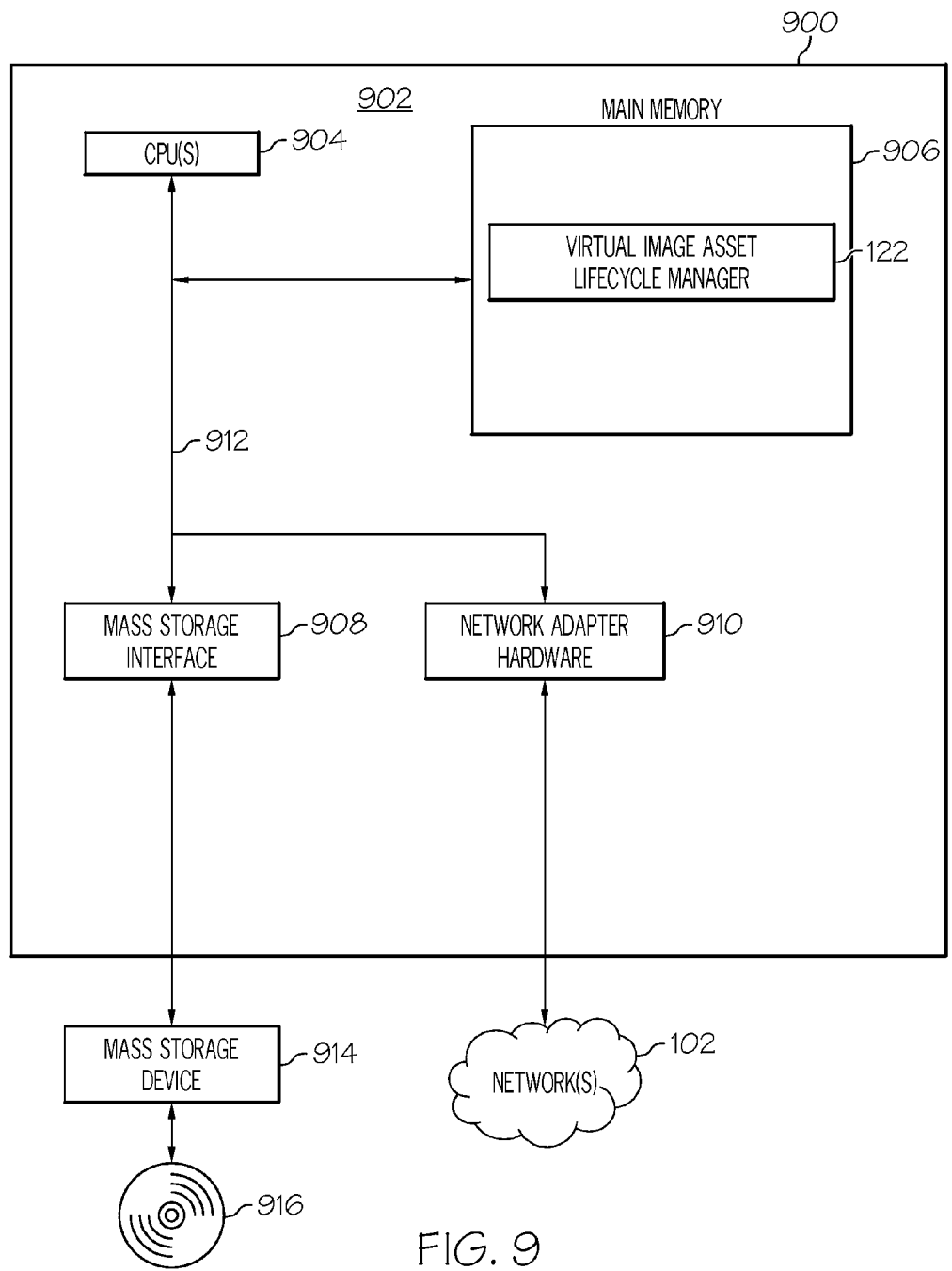
FIG. 9 is a block diagram illustrating a detailed view of an information processing system according to one embodiment of the present invention.

FIG. 9 is a block diagram illustrating a more detailed view of an information processing system 900, such as the server 108, that can be utilized in the operating environment 100 discussed above with respect to FIG. 1. The information processing system 900 is based upon a suitably configured processing system adapted to implement one or more embodiments of the present invention. Similarly, any suitably configured processing system can be used as the information processing system 900 by embodiments of the present invention.

The information processing system 900 includes a computer 902. The computer 902 has a processor(s) 904 that is connected to a main memory 906, mass storage interface 908, and network adapter hardware 910. A system bus 912 interconnects these system components. The main memory 906, in one embodiment, comprises the virtual image asset lifecycle manager 122 and its components as shown in FIG. 1.

Although illustrated as concurrently resident in the main memory 906, it is clear that respective components of the main memory 906 are not required to be completely resident in the main memory 906 at all times or even at the same time. In one embodiment, the information processing system 900 utilizes conventional virtual addressing mechanisms to allow programs to behave as if they have access to a large, single storage entity, referred to herein as a computer system memory, instead of access to multiple, smaller storage entities such as the main memory 906 and data storage device 916. Note that the term "computer system memory" is used herein to generically refer to the entire virtual memory of the information processing system 900.

The mass storage interface 908 is used to connect mass storage devices, such as mass storage device 914, to the information processing system 900. One specific type of data storage device is an optical drive such as a CD/DVD drive, which may be used to store data to and read data from a computer readable medium or storage product such as (but not limited to) a CD/DVD 916. Another type of data storage device is a data storage device configured to support, for example, NTFS type file system operations.

Although only one CPU 904 is illustrated for computer 902, computer systems with multiple CPUs can be used equally effectively. Embodiments of the present invention further incorporate interfaces that each includes separate, fully programmed microprocessors that are used to off-load processing from the CPU 904. An operating system (not shown) included in the main memory is a suitable multitasking operating system such as any of the Linux, UNIX, Windows, and Windows Server based operating systems. Embodiments of the present invention are able to use any other suitable operating system. Some embodiments of the present invention utilize architectures, such as an object oriented framework mechanism, that allows instructions of the components of operating system (not shown) to be executed on any processor located within the information processing system 900. The network adapter hardware 910 is used to provide an interface to a network 102. Embodiments of the present invention are able to be adapted to work with any data communications connections including present day analog and/or digital techniques or via a future networking mechanism.

Although the exemplary embodiments of the present invention are described in the context of a fully functional computer system, those of ordinary skill in the art will appreciate that various embodiments are capable of being distributed as a program product via CD or DVD, e.g. CD 916, CD ROM, or other form of recordable media, or via any type of electronic transmission mechanism.

NON-LIMITING EXAMPLES

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for managing lifecycles of virtual image assets, the method comprising:
    analyzing a set of assets comprising a set of virtual image assets and a set of software bundle assets;
    determining, based on analyzing the set of assets, at least a portion of relationship data between one or more of the virtual image assets and software bundle assets;
    storing the at least a portion of relationship data in a memory;
    determining that at least one of:
        one or more of the set of virtual image assets, and
        one or more of the set of software bundle assets,
    is associated with a set of changes comprising at least one of the following:
        a change in a file contained in an asset,
        a change in a relationship between an asset and other assets, and
        a change in a state of an asset;
    identifying, based on the at least a portion of relationship data, at least one virtual image asset in the set of virtual image assets that is related to the at least one of one or more virtual image assets and the one or more software bundle assets that is associated with the set of changes;
    updating, in response to the identifying, the at least one virtual image asset that has been identified based on the set of changes;

identifying one or more users associated with the virtual image asset that has been identified based on the set of user information;
displaying a notification, via a user interface, to the one or more users notifying the users that the at least one virtual image asset is associated with the set of changes;
wherein displaying a notification further comprises:
  displaying a set of update operations associated with the virtual image asset that has been identified based on the set of changes;
regenerating a derived virtual image asset;
automatically redeploying an instance of an image asset that is associated with the set of changes;
ignoring the set of changes; and
rolling back the virtual image asset that is associated with the set of changes to a previous state that is prior to the set of changes becoming associated with the virtual image asset.

2. The method of claim 1, further comprising:
generating a graph based on the at least a portion of relationship data, the graph comprising a plurality of nodes, wherein at a first node in the plurality of nodes is a virtual image asset from the set of virtual image assets, and wherein at least a second node in the plurality of nodes is a software bundle asset from the set of software bundle assets, the graph indicating a relationship between the first node and the second node.

3. The method of claim 1, further comprising:
identifying a set of users associated with the set of virtual image assets; and
storing a set of user information associated with the set of users that have been identified with the at least a portion of relationship data.

4. The method of claim 1, wherein updating the virtual image asset that has been identified based on the set of changes is based on one of the update operations that has been selected by the one or more users.

5. The method of claim 1, wherein updating the virtual image asset that has been identified is automatically performed without user intervention.

6. The method of claim 1, wherein the set of relationship information comprises at least one of:
  relationship information indicating compatibility information between virtual image assets from the set of virtual image assets and software bundle assets from the set of software bundle assets;
  relationship information indicating that a first virtual image asset was used to create a second virtual image asset;
  relationship information indicating that a virtual image asset uses a software bundle asset;
  relationship information indicating that a first software bundle asset requires a second software bundle asset;
  relationship information indicating that a third software bundle asset configures a fourth software bundle asset; and
  relationship information indicating that a third virtual image asset is superseded by a fourth virtual image asset.

* * * * *